United States Patent

Joshi et al.

[11] Patent Number: 5,500,030
[45] Date of Patent: Mar. 19, 1996

[54] OXY-GAS FIRED FOREHEARTH BURNER SYSTEM

[75] Inventors: Mahendra L. Joshi, Altamonte Springs; Lee Broadway, Eustis, both of Fla.

[73] Assignee: Combustion Tec, Inc., Apopka, Fla.

[21] Appl. No.: 205,192

[22] Filed: Mar. 3, 1994

[51] Int. Cl.⁶ ........................................ F23D 14/32
[52] U.S. Cl. .................. 65/346; 65/134.4; 65/347; 239/416.3; 239/416.4; 239/416.5; 239/423; 239/424; 431/181; 431/350
[58] Field of Search .............. 239/416.3, 416.4, 239/416.5, 423, 424; 65/134.4, 346, 347; 431/350, 181

[56] References Cited

U.S. PATENT DOCUMENTS

| | | | |
|---|---|---|---|
| 3,321,288 | 5/1967 | Griem, Jr. | 65/17.4 |
| 4,394,120 | 7/1983 | Golovanov et al. | 431/284 |
| 4,515,553 | 5/1985 | Morimoto et al. | 431/8 |
| 4,525,175 | 6/1985 | Stellaccio | 48/86 R |
| 4,531,960 | 7/1985 | Desprez | 65/134 |
| 4,662,927 | 5/1987 | Blumenfeld | 65/162 |
| 4,668,180 | 5/1987 | Newman | 431/187 |
| 4,708,728 | 11/1987 | Desprez et al. | 65/136 |
| 5,092,760 | 3/1992 | Brown et al. | 431/10 |
| 5,147,438 | 9/1992 | Castelain et al. | 65/135 |
| 5,169,424 | 12/1992 | Grinnen et al. | 65/346 |

Primary Examiner—David L. Lacey
Assistant Examiner—Sean Vincent
Attorney, Agent, or Firm—Speckman, Pauley & Fejer

[57] ABSTRACT

An oxy-fuel burner for a forehearth system comprising an oxygen conduit and a fuel conduit disposed concentrically within the oxygen conduit, forming an annulus between the fuel conduit and the oxygen conduit. The fuel firing end of the fuel conduit is recessed within the oxygen conduit at a distance from the oxygen firing end of the oxygen conduit. The ratio of the inside diameter of the oxygen firing end of the oxygen conduit to the inside diameter of the fuel firing end of the fuel conduit is in the range of about 2:1 to 8:1.

7 Claims, 3 Drawing Sheets

OXY-GAS FIRED FOREHEARTH BURNER SYSTEM

BACKGROUND OF THE INVENTION

1. Field of the Invention

This invention relates to forehearth systems for conditioning molten glass from a glass melter and rendering it suitable for subsequent processing, such as forming it into a desired shape. More particularly, this invention relates to burner systems suitable for use in forehearth systems.

2. Description of Prior Art

The forehearth section of a glass manufacturing operation is disposed between the glass melting furnace in which the raw materials for making glass are melted and the processing section in which the molten glass is processed into the desired form or shape. The forehearth system is designed to receive molten glass from the glass melting furnace and convey it to the glass processing operation, conditioning the molten glass during conveyance between the glass melter and the glass processing operation, thereby rendering it suitable for processing. In particular, the forehearth is designed to heat or cool the glass to the temperature required for processing.

The typical forehearth system comprises a cooling section which receives molten glass from the melter portion of the furnace, and a front conditioning section which receives molten glass from the cooling section. The conditioning section lies between the cooling section and the glass processing section. The cooling and conditioning sections are provided with independently controlled firing systems.

The cooling section of the forehearth system receives molten glass from the melter and cools or heats it to the proper average temperature required for the type of glass being made, such as containers made by a forming machine or fibers stretched by various attenuation devices. When the desired glass temperature cannot be obtained by radiation alone while maintaining properly set flames above the molten glass, additional cooling air is introduced into the cooling section of the forehearth above the molten glass.

From the cooling section, the glass flows into the conditioning section of the forehearth in which the temperature of the glass is equalized only by heating, using burners disposed within the walls of the forehearth, and not by cooling. The temperature in the conditioning section is controlled independently of the temperature in the cooling section. The conditioning section is intended only to hold and equalize the temperature and, thus, the viscosity of the glass.

Traditional firing systems for heating the glass in the conditioning section of a forehearth system are of a combustion premix design where the fuel, for example natural gas, and the combustion air are premixed together before they are introduced to the burner. See for example, U.S. Pat. No. 5,169,424 which generally teaches a forehearth structure for a glass melting furnace including gas burners for providing heat to the molten glass flowing through the forehearth. See also U.S. Pat. No. 4,662,927 which teaches a forehearth system having fuel-air burner nozzles which provide a flame for heating the space above the flowing molten glass and U.S. Pat. No. 4,708,728 which teaches a premixed fuel-air burner for heating the forehearth of a glass melter, the burner having a capillary tube disposed coaxially therein and extending beyond the end of the burner for feeding oxygen into the fuel-air premixture.

However, numerous problems are associated with traditional forehearth firing systems which employ premixed air-fuel burners for heating the flowing glass including poor fuel efficiency, little or no flame luminosity, very limited turndown ratio, a high volume of combustion gases and associated emissions within and outside of the glass plant, a generally high noise level due to the air-gas combustion system and, finally, the inability to provide precise temperature control of the glass, as small as 1° or 2° F., due to the significant variations in atmospheric air used by air-gas firing systems.

In traditional air-gas fired forehearth systems, the individual burner firing capacity, placement of burners, cooling air flow rate and location, and glass level within the forehearth system are controlled to achieve the objectives of glass temperature uniformity and glass viscosity in accordance with the requirements of the particular glass processing operation. Other than changing the firing rate of individual burners, alteration of each of these control parameters results in increases in capital costs, operating costs, and/or interruption of the glass manufacturing process.

The most common approach to controlling the temperature of a given zone within a forehearth system is to adjust the firing rate of the burner(s) corresponding to the particular zone to compensate for the net heat loss or heat gain within the zone. Known temperature control systems consist essentially of thermocouples immersed in the molten glass or a radiation pyrometer sighted on the surface of the glass, an electronic-type recording instrument for recording and controlling the temperature of the glass, and an electrically operated valve for adjusting the fuel input.

U.S. Pat. No. 3,321,288 teaches a temperature control apparatus for controlling the temperature of glass entering the forehearth of a glass melter in which cooling air and hot combustion gases are continuously supplied over the molten glass in the temperature control zone and the volumes thereof are varied relative to one another to maintain the temperature of the glass downstream of the zone substantially constant.

As previously stated, one of the disadvantages of a premixed air-fuel firing system is the very limited turndown ratio which, in turn, limits the level of control on the forehearth when responding to a temperature control signal to either decrease or increase fuel input. Turndown ratio, that is, the high firing rate of the burner divided by the low firing rate of the burner, for a premix burner is about 4:1 because velocities of the premixed air-gas flame which are too low result in flashback while velocities which are too high will blow the flame from the burner nozzle. To improve the turndown ratio of forhearth burners, it is known to change the premix burner nozzle design based on the type of flame sought to be produced. However, burner performance is only generally marginally improved by implementation of these techniques with respect to turndown.

Another disadvantage of premix air-gas flames is the fact that they are generally very short and transparent. Flame luminosity is almost nonexistent. A short, nonluminous flame is considered very poor for imparting radiative heat flux to the molten glass because the wave length for improved transmittance through the majority of glass falls between about 0.5 to 2 micron meters. Thus, the flame should have visible radiation wave length as emitted by the combustion of soot particles. The absence of a luminous flame results in a very non-efficient heating process, the combustion gases failing to efficiently release heat to the glass and forehearth superstructure. Thus, this heat is generally carried away in the form of exhaust gases to the stack, resulting in a net heat loss.

Finally, compared to oxygen-utilizing combustion systems, the fuel efficiency of an air-gas system is significantly inferior due to nitrogen contained in the air. It is known that, for example, 100% oxygen-gas combustion can reduce fuel consumption by about 60% compared to air-gas combustion without any heat recovery. U.S. Pat. No. 5,147,438 teaches an auxiliary oxy-fuel burner for glass melting having a central fuel nozzle disclosed concentrically within an oxygen nozzle; U.S. Pat. No. 4,531,960 teaches a process for making glass using air-fuel and oxygen-fuel burners where the flame produced by the oxygen-fuel burners is surrounded by a current of auxiliary gas, such as air or nitrogen, introduced through an annular space surrounding the burner; and U.S. Pat. No. 5,092,760 teaches an oxy-liquid fuel burner where oxygen or carbon dioxide are used as an atomizing fluid for the liquid fuel.

However, none of the prior art of which we are aware teaches or suggests an oxy-fuel fired burner for use in the forehearth system of a glass melting furnace as a way of addressing the problems associated with premixed air-fuel firing as discussed hereinabove.

SUMMARY OF THE INVENTION

Accordingly, it is an object of this invention to provide a forehearth burner system having a higher turndown ratio than known air-fuel forehearth burner systems.

It is another object of this invention to provide a forehearth burner system which produces a highly luminous flame compared to the low luminosity flames produced by air-fuel systems.

It is yet another object of this invention to provide a forehearth burner system which is fuel efficient.

It is yet another object of this invention to provide a forehearth system for a glass melting furnace having improved forehearth temperature control.

These and other objects of this invention are achieved by an oxy-fuel burner for a forehearth system comprising an oxygen conduit and a fuel conduit disposed coaxially within said oxygen conduit, thereby forming an annulus between the fuel conduit and the oxygen conduit. The firing end of the fuel conduit comprises a fuel nozzle, the firing end of which is recessed within the oxygen conduit at a distance from the oxygen firing end of the oxygen conduit, the oxygen firing end of the oxygen conduit being disposed toward the interior of the forehearth. To provide the required combustion characteristics for achieving the objectives of this invention, the ratio of the inside diameter of the oxygen firing end to the inside diameter of the fuel nozzle end is critically disposed in the range of about 2:1 to 8:1. Operation outside of this range, for example, produces flames with low luminosity.

In accordance with a preferred embodiment of this invention, the distance between the firing end of the fuel nozzle and the oxygen firing end of the oxygen conduit is about ½ of the inside diameter of the oxygen firing end of the oxygen conduit.

A forehearth system for conveyance and temperature control of molten glass in accordance with this invention comprises a floor portion and oppositely disposed sidewalls adjacent said floor portion, forming an elongated trough. A roof portion is disposed adjacent to the sidewalls over the trough and firing means are disposed within at least one opening in the sidewalls. The firing means comprise an oxy-fuel burner comprising a fuel conduit coaxially disposed within an oxygen conduit and forming an annulus between the fuel conduit and the oxygen conduit where the firing end of the fuel conduit is recessed within the oxygen conduit at a distance from an oxygen nozzle end of the oxygen conduit, said oxygen nozzle end disposed towards an interior of said forehearth. The ratio of the inside diameter of the oxygen nozzle end to the inside diameter of the firing end of the fuel conduit is in the range of about 2:1 to 8:1.

BRIEF DESCRIPTION OF THE DRAWINGS

The above-mentioned and other features and objects of this invention will be better understood from the following detailed description taken in conjunction with the drawings, wherein.

DESCRIPTION OF PREFERRED EMBODIMENTS

Figure 1:
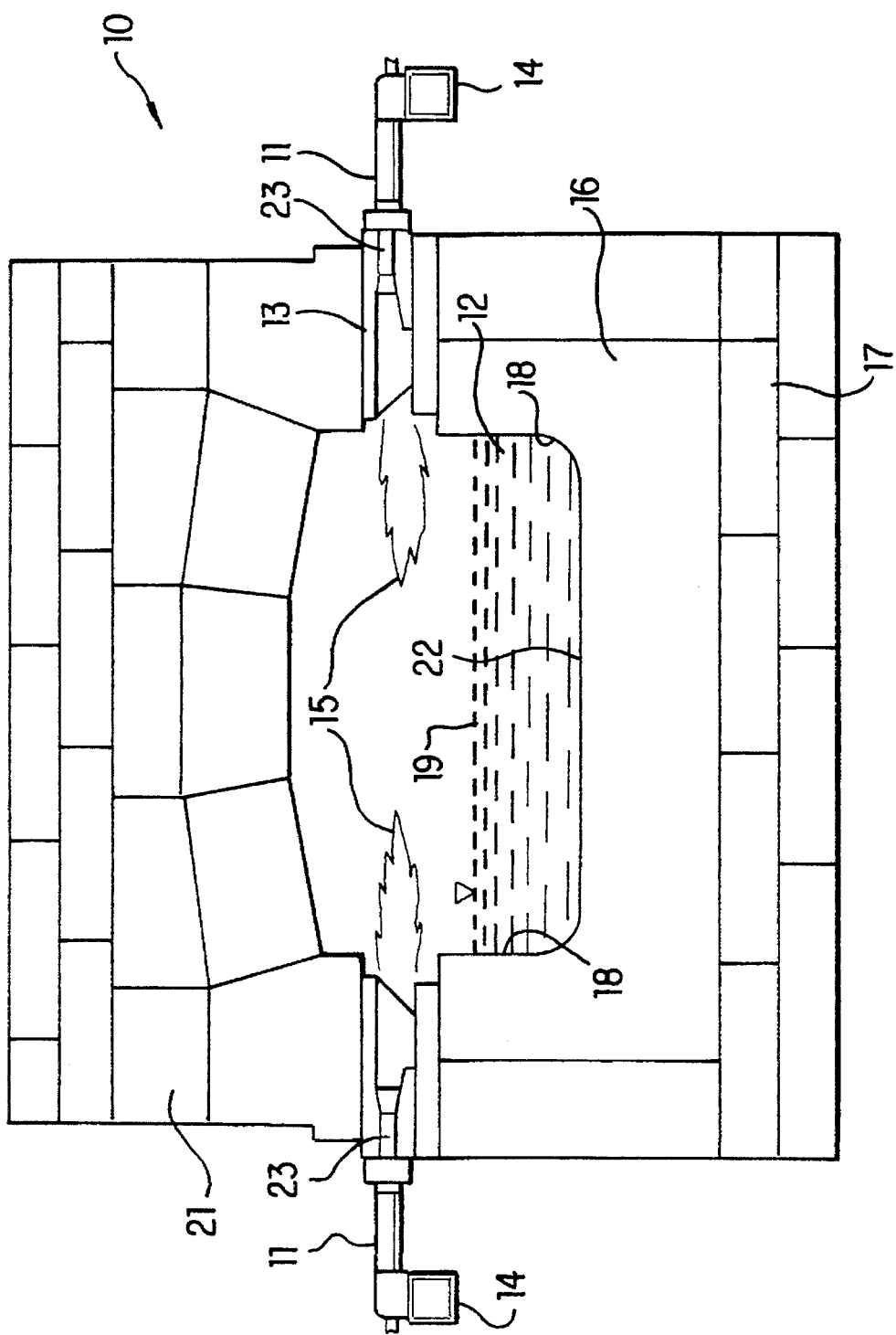
FIG. 1 is a cross-sectional view of a forehearth suitable for use with a glass melter.

FIG. 1 is a cross-sectional view of a typical forehearth 10 for a glass melting furnace comprising longitudinally extending trough 16 supporting a bed of molten glass 12 therein. Trough 16 is supported by substructure 17. Trough 16 has a substantially wide floor portion 22 and oppositely-disposed inner sidewall surfaces 18 which project above the top level or upper surface 19 of molten glass 12. Above trough 16, and spanning the trough's width, is roof structure 21, typically formed in a building block arrangement using solid refractory and insulating block sections having complimentary registering surfaces between adjacent sections which stack and unite to form the whole.

Along the flat top surface of each long side of trough 16 are burner blocks 13. Burner blocks 13 rest upon both trough 16 respective top wall surfaces and the respective top wall surfaces of substructure 17. Roof structure 21, along with burner blocks 13, define a longitudinally-extending space or tunnel above top surface 19 of molten glass 12. Each burner block 13 forms a laterally extending burner block bore which communicates with the longitudinally-extending space above top surface 19 of molten glass 12. Disposed within the bore is nozzle 23 of burner 11. Fuel and air are provided through manifold 14 and are ignited, producing flame 15 in the space disposed above top surface 19 of molten glass 12.

Premixed "air-gas" flames are generally very short and transparent. Flame luminosity is almost nonexistent. Short, non-luminous flame is considered very poor for imparting radiative heat-flux to the glass, because the wave length for improved transmittance through the majority of glass falls around 0.5 to 2.0 micron meters. The absence of a luminous flame results in a very non-efficient heating process because the combustion gases fail to efficiently release heat to the glass and forehearth superstructure. Instead, the combustion gases ultimately carry this heat in the form of exhaust gases to the stack, thereby constituting a net heat loss.

The fuel efficiency of an "air-gas" system, particularly due to nitrogen contained in the air, compared to 100% oxygen-gas combustion is significantly inferior. A 100% "oxygen-gas" combustion reduces fuel consumption by about 60% compared to "air-gas" combustion without any heat recovery. In addition, the use of "oxygen-gas" combustion results in a reduction in the volume of combustion gases by about 80% coupled with a significant reduction in $NO_x$ emissions and volatiles from the glass. Also, by eliminating combustion air blowers/compressors, the noise level is reduced by 20 to 35 dB, providing a significant improvement in the working environment.

Figure 2:
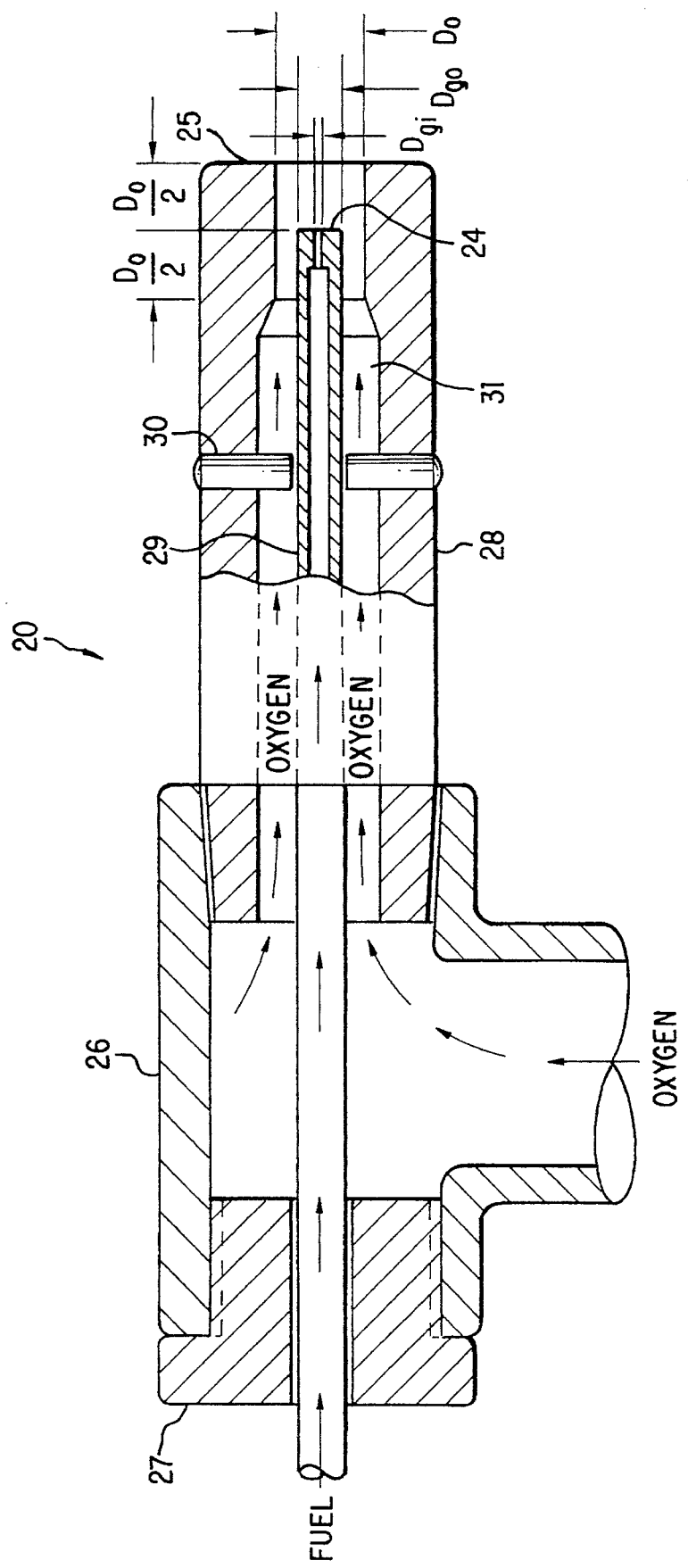
FIG. 2 is a partial cross-sectional side view of an oxy-fuel burner in accordance with one embodiment of this invention.

An oxy-fuel burner in accordance with one embodiment of this invention suitable for use in a forehearth system is shown in cross-section in FIG. 2. Oxy-fuel burner 20 comprises fuel conduit 29 disposed concentrically within oxygen conduit 28 and forming annulus 31. Fuel firing end 24 of fuel conduit 29 is recessed within oxygen conduit 28 at a distance from oxygen firing end 25 of oxygen conduit 28. The inside diameter of fuel conduit 29 at fuel firing end 24 is designated as $D_{gi}$. The outside diameter of fuel conduit 29 is designated as $D_{go}$. The inside diameter of oxygen conduit 28 at oxygen firing end 25 is designated as $D_o$. In accordance with a preferred embodiment of this invention, the ratio of $D_o/D_{gi}$ is in the range of about 2:1 to 8:1. This relationship is critical for providing a flame with the desired characteristics.

Table 1 summarizes the various design parameters of the oxy-gas forehearth burner in accordance with one embodiment of this invention. The design criteria are based upon application to a forehearth 10 having a 16" wide trough 16 and a forehearth 10 having a 26" wide trough 16.

Figure 3:
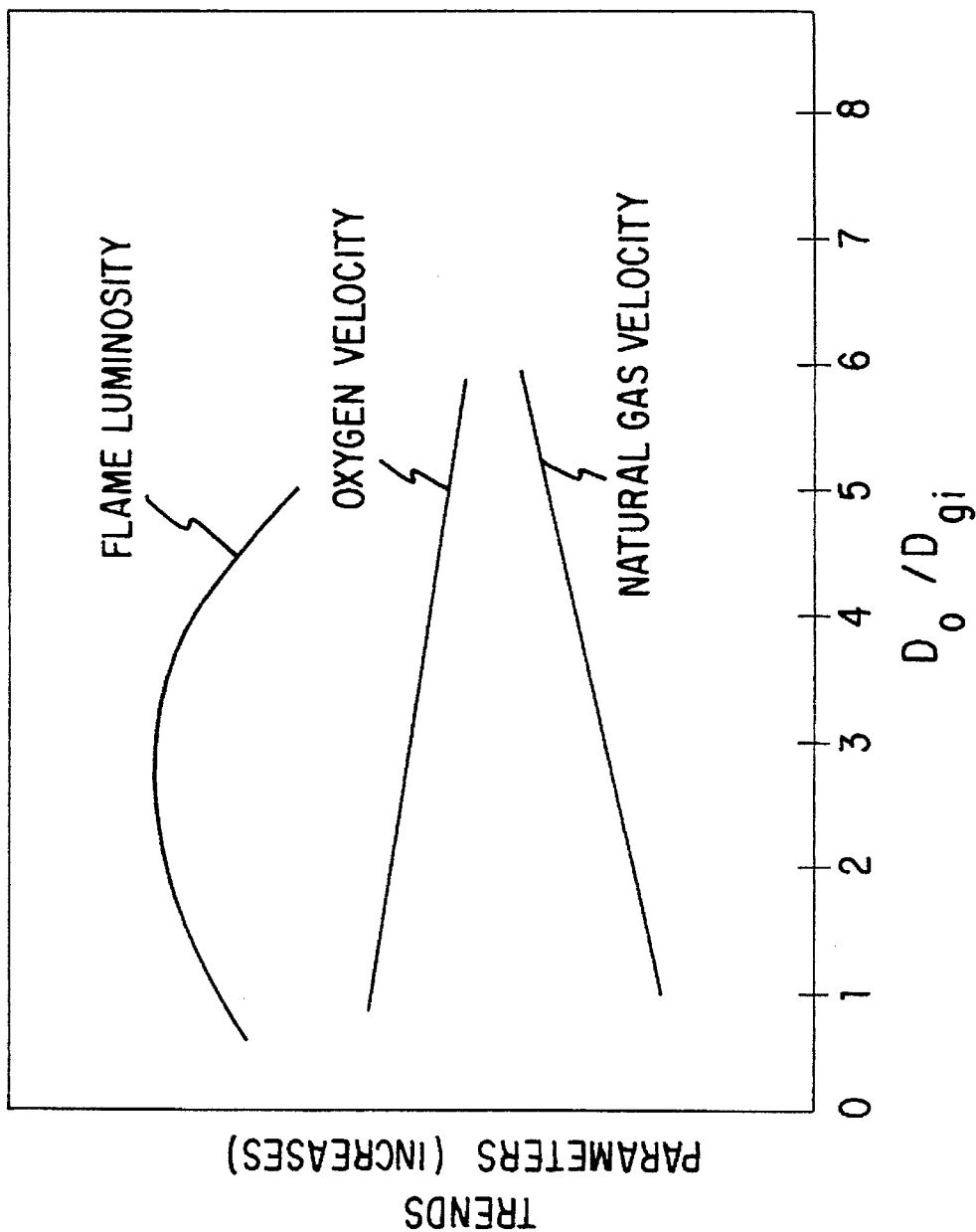
FIG. 3 is a diagram showing the effect of the ratio of oxygen orifice diameter to natural gas orifice diameter on the performance parameters of the burner of this invention.

FIG. 3 shows the critical nature of the ratio of the inside diameter $D_o$ of oxygen firing end 25 of oxygen conduit 28 to the inside diameter $D_{gi}$ of fuel firing end 24 of fuel conduit 29 in terms of burner performance. As previously stated, the ratio $D_o/D_{gi}$ is in the range of 2:1 to 8:1 and preferably in the range of 2.5:1 to 3.0:1. Outside of this range, as shown in FIG. 3, flame luminosity decreases, thereby reducing the efficiency of the burner.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An oxy-fuel burner for a forehearth system comprising:
    oxygen means for introducing oxygen into said forehearth system, said oxygen means comprising an oxygen conduit;
    a fuel conduit disposed concentrically within said oxygen conduit and forming an annulus between said fuel conduit and said oxygen conduit, a fuel firing end of said fuel conduit recessed within said oxygen conduit at a distance from an oxygen firing end of said oxygen conduit; and

TABLE 1

| FOREHEARTH CHANNEL WIDTH | GAS FLOW RANGE (SCFH) | OXYGEN FLOW RANGE (SCFH) | TURNDOWN RATIO LOW/HIGH FIRING RANGE | $D_o/D_{gi}$ RATIO (RANGE) | OPTIMUM $D_o/D_{gi}$ RATIO | APPROX FLAME LENGTHS | FLAME CHARACTERISTICS |
|---|---|---|---|---|---|---|---|
| 16" WIDE | 5–50 | 10–100 | 1:10 | 2–8 | 2.5 | (6"–12") | LUMINOUS (LAZY TO SHARP) |
| 26" WIDE | 5–100 | 10–200 | 1:20 | 2–4 | 3.0 | (6"–20") | LUMINOUS (LAZY TO SHARP) |

As shown in Table 1, the ratio of $D_o/D_{gi}$ is in the range of 2–8. For forehearth 10 having a 16" wide trough 16, the ratio $D_o/D_{gi}$ is in the range of 2–8; in the case of forehearth 10 having a 26" wide trough 16, the ratio $D_o/D_{gi}$ is in the range of 2–4. In both cases shown in Table 1, the flame produced by burner 11 is luminous, varying in appearance from lazy to sharp based upon firing rate of the burner. In particular, the flame shape transition from lazy to sharp occurs during transition of burner 11 from a low fire condition to a high fire condition.

Also critical to the design of burner 10 is the disposition of fuel firing end 24 within oxygen conduit 28. In particular, fuel firing end 24 is disposed at a distance from oxygen firing end 25 of oxygen conduit 28, said distance being about ½ the inside diameter $D_o$ of oxygen firing end 25 of oxygen conduit 28. That is, the distance between fuel firing end 24 of fuel conduit 29 and oxygen firing end 25 of oxygen conduit 28 is about $D_o/2$.

As shown in FIG. 2, oxy-fuel burner 11 further comprises Tee-connection 26 having a first leg sealingly connected to an oxygen supply end of oxygen conduit 28 and plug 27 sealingly disposed in a second leg of Tee-connection 26 and forming a communication means for conveying a fuel directly into a fuel supply end of fuel conduit 29. Centering pins 30 disposed at least partially within annulus 31 are provided for centering fuel conduit 29 within oxygen conduit 28.

a ratio of the inside diameter of said oxygen firing end to the inside diameter of said fuel firing end being in a range of about 2:1 to 8:1.

2. An oxy-fuel burner in accordance with claim 1, wherein said distance between said fuel firing end and said oxygen firing end is about 1/2 of the inside diameter of said oxygen firing end.

3. An oxy-fuel burner in accordance with claim 1 further comprising a Tee-connection having a first leg sealingly connected to an oxygen supply end of said oxygen conduit and a plug sealingly disposed in a second leg of said Tee-connection and forming communication means for conveying a fuel directly into a fuel supply end of said fuel conduit.

4. An oxy-fuel burner in accordance with claim 1, wherein said fuel conduit is centered within said oxygen conduit by centering pins.

5. In a forehearth system for conveyance and temperature control of molten glass having a floor portion and oppositely disposed sidewalls adjacent said floor portion forming an elongated trough, a roof portion adjacent said sidewalls and disposed over said trough, and firing means disposed within at least one opening in said sidewalls, the improvement comprising:
    an oxy-fuel burner comprising a fuel conduit coaxially disposed within an oxygen conduit and forming an annulus between said fuel conduit and said oxygen conduit, a fuel firing end of said fuel conduit recessed within said oxygen conduit at a distance from an oxygen firing end of said oxygen conduit;

and a ratio of the inside diameter of said oxygen firing end to the inside diameter of said fuel firing end being in a range of about 2:1 to 8:1.

6. In a forehearth system in accordance with claim 5, wherein said distance between said fuel firing end and said oxygen firing end is about ½ the inside diameter of said oxygen firing end.

7. In a forehearth system in accordance with claim 5 further comprising an oxygen supply means connected to an oxygen supply end of said oxygen conduit and a fuel supply means connected to a fuel supply end of said fuel conduit.

* * * * *